United States Patent Office 2,966,036
Patented Dec. 27, 1960

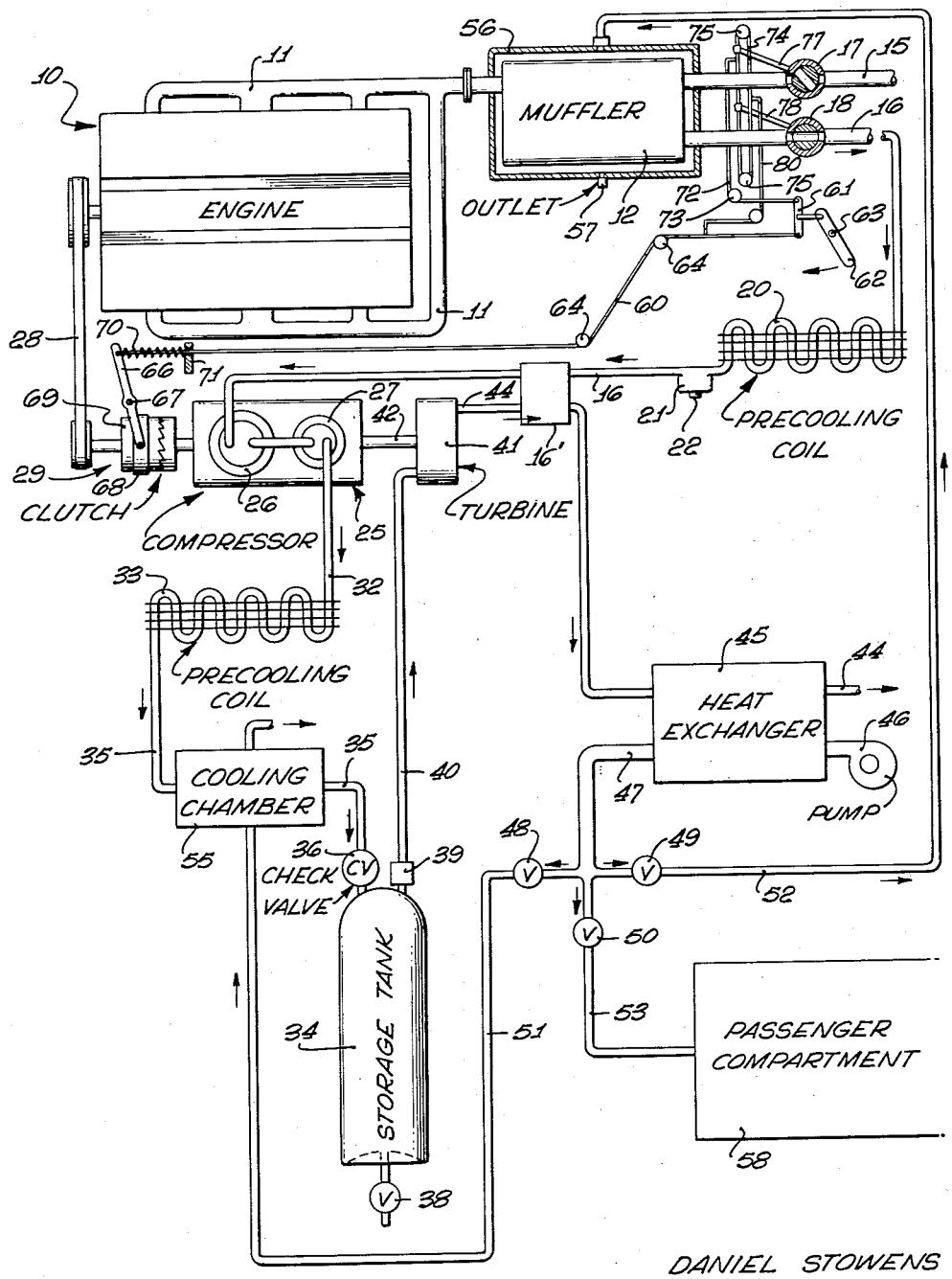

2,966,036

METHOD AND APPARATUS FOR PROCESSING PRODUCTS OF COMBUSTION

Daniel Stowens, 7114 Hillside Ave., Los Angeles 46, Calif.

Filed Feb. 19, 1959, Ser. No. 794,351

19 Claims. (Cl. 62—11)

This invention relates to the processing of products of combustion from a source of such products and relates more particularly to improvements in collecting, processing and separating noxious and harmful constituents of such products from inert and harmless constituents.

It has long been known that products of combustion from whatever source contain a multitude of constituents, many of which are noxious and harmful to both plant and animal life as well as to clotaing, surface finishes and property generally. When these products are discharged into the atmosphere in concentrated quantities, serious problems are presented, which have received scant attention until recent years. It is now generally recognized, and particularly by chemists and the medical profession, that serious threats to property and health are presented by the presence of these products in the air we breathe.

Following recognition of the foregoing factors and hazards, both individual and organized group studies have been initiated to analyze the problem and to provide methods and apparatuses for treating products of combustion to render them harmless or substantially so. For the most part, these proposals have dealt with more efficient and effective combustion methods in the belief that completely consumed fuel will result in combustion products of a harmless, inert and non-irritant nature. This view quite ovrelooks the fact that combustion products from fuels generally, even when fully combusted, commonly contain a very large number of separate compounds, some of which are harmful to plant or animal life or to both.

Although the desirability of holding the combustion products captive has been proposed heretofore to alleviate these undesirable affects, the procedures, techniques and equipment provided for this purpose have been subject to so many defects and disadvantages as not to be practical or commercially acceptable. For example, it has been proposed to collect the exhaust gases of a motor vehicle in an expansible container while driving in congested areas and releasing these stored gases to the atmosphere when driving through open and sparsely populated areas. Such a proposal creates more problems than it solves and quite obviously is neither feasible nor acceptable for numerous reasons, including the large storage capacity for gas required and the adverse affect of back pressure imposed on the engine exhaust manifold as the quantity of stored gas increases.

Other proposals have been made for collecting and compressing exhaust gases from internal combustion engines, but these have had as their principal objective the separation of useful constituents for which there is a profitable use, such as the carbon dioxide present in considerable quantities in engine exhaust gases. Accordingly, the separating equipment designed for this purpose is of a special character unsuitable for attaining the objectives of the present invention.

For example, it is a specific purpose of this invention to provide simple, efficient and effective means for collecting the exhaust gases and products of combustion from whatever source, including furnaces and internal combustion engines, and for subjecting the same to special treatment to remove and hold captive harmful constituents while releasing the non-harmful constituents. A particular efficacious mode of separating the gases into these two groups utilizes cooling and pressure by simple expedients to be explained in detail hereinbelow to the end that objectionable components will be condensed and collected in appropriately disposed collection vessels. Non-objectionable constituents, and particularly the inert gases such as nitrogen and other inactive constituents, are released from the apparatus, and preferably under conditions such that much of the energy present therein is utilized beneficially. One manner of utilizing this energy is to expand the high pressure constituents as they pass through an expansion turbine thereby providing useful power as well as effecting the cooling of the expanding gases. The power may be utilized for any desired purpose and the cooled expanded gases may be passed in heat exhange with any medium or object desired to be cooled including the products of combustion undergoing treatment and separation as well as a separate medium, such as air, for use in the air conditioning of a closed chamber.

The invention is suitable for use in both stationary and moving installations, as for example, in treating combustion gases produced in industrial operations as well as the exhaust gases issuing from an internal combustion engine irrespective of whether this engine is stationary or is used to propel a vehicle such as a truck or a passenger vehicle. In each of these diverse applications, the means employed to compress the gases undergoing processing can be driven from an independent power source or directly from the internal combustion engine supplying the gases to be processed. In the latter case, it will be appreciated that the capacity of the pressurizing means should be adequate to satisfy maximum requirements and preferable to vary in proportion to the volume of gases exhausting therefrom. The gases undergoing processing are conveyed to a high pressure storage chamber through a suitable heat exchanger effective to remove heat carried by the gases as they leave their source and additionally the heat of compression.

Desirably, gases wnich do not liquefy at a predetermined pressure selected as the system operating pressure are vented from the storage chamber through a suitable expansion chamber, as for example, an expansion turbine. The latter is preferably coupled to drive an air circulating fan or to supplement the vehicle engine in driving the system gas compressor. The resulting expanded cold gas issuing from the expansion turbine may be used in a variety of ways at the user's option, as for example, in precooling the exhaust gases both before and following compression. The cooling capacity of the exhaust gases can also be used to cool the vehicle engine, the compressor and the passenger compartment, or vehicle space occupied either by cargo or passengers.

Accordingly, it is a primary object of the present invention to provide an improved method and apparatus for treating products of combustion to render the same substantially harmless to persons and to plant life in the surrounding area.

Anotner ooject of the invention is the provision of an effective closed apparatus for receiving and processing the products of combustion issuing from a furnace or an internal combustion engine and retaining the same captive while subjecting these products to processing to separate objectionable constituents and thereafter allowing un-objectionable and inert constituents to be vented from the apparatus.

Another object of the invention is the provision of apparatus which may be connected to the motor of a road vehicle and carried directly on the vehicle for processing the products of combustion discharging from the engine and separating condensible constituents thereof from those which remain in gaseous form at a preselected operating pressure, including means for venting non-condensing gases to the atmosphere while deriving energy therefrom to provide useful power and useful cooling.

Another object of the invention is the provision of a gas treating and compressing system for use on motor vehicles and arranged to be driven by the vehicle propelling engine, the treating apparatus including means compressing the engine exhaust gases to condense certain constituents thereof while expanding pressurized non-condensing constituents in a manner producing a cooling effect useful in absorbing heat from the exhaust gases enroute to the high pressure storage and separating chamber.

These and other more specific objects will appear upon reading the following specification and claims and upon considering in connection therewith the attached drawing to which they relate.

Referring now to the drawing in which a preferred embodiment of the invention is illustrated:

The single view of the accompanying drawing is a schematic representation of apparatus suitable for practicing the present invention.

The apparatus used by way of example in practicing the gas treating process of the present invention is herein shown as connected to the exhaust manifold of a vehicle propelling engine designated generally 10. However, it is pointed out that the gases to be treated may be from any source of products of combustion including furnaces and ovens of all types and sizes. Products of combustion from whatever source pass through closed passage means such as engine manifold 11, 11 to the closed treatment system. In the case of an internal combustion engine, the gases would normally pass into a suitable acoustical muffler 12. As here shown, the outlet end of muffler 12 is provided with a pair of conduits 15 and 16, each controlled by a suitable valve 17, 18, outlet duct 15 discharging directly to the atmosphere when valve 17 is open. Normally and when the gases are being processed, valve 17 will be closed and valve 18 in duct 16 will be open.

Duct 16 preferably leads through a suitable heat exchanger or precooling coil 20 so disposed and arranged as to drain condensate and particularly water into a sump chamber 21 having a drain plug 22 by which the liquid contents may be drained to a point of disposal during a servicing period.

The precooled products of combustion issuing from precooler 20 continue through duct 16 into a suitable compressor preferably of the multiple stage type having a low pressure chamber 26 and a second or high pressure chamber 27 connected in series. Compressor 25 may be driven in any suitable manner, such as by an independent power source, but preferably from the prime mover proper, such as engine 10. Where prime mover 10 is being used to propel a vehicle, compressor 25 may be conveniently located in the motor compartment and suitably connected to the engine main drive shaft as by V-belt 28 and a clutch 29. It will also be recognized that compressor 25 may be located beneath the vehicle and arranged to be driven from the rear end of the engine through appropriate drive connections to the main crank shaft or to the drive shaft for the rear wheels. In other operating environments, and particularly where the system of this invention is being used to handle products of combustion from a furnace chamber, it will be understood that a separate source of power for the compressor will usually be desirable.

The hot compressed products of combustion issuing from the final stage 27 of compressor 25 pass through a duct 32 and through a second heat exchanger or pre-cooling coil 33 and then into a suitable high pressure storage vessel or chamber 34 by way of conduit 35 and a check valve 36. Storage chamber 34 preferably comprises one or more heavy duty cylindrical chambers such as that commonly employed to ship and store gases of all kinds under high pressures. Inasmuch as the compressed gas entering chamber 34 contains acids and other corrosive chemicals, chamber 34 desirably is formed of a material immune to attack by these agents. Alternatively, chamber 34 may comprise a steel tank coated on its interior with a protective coating such as glass or other material safeguarding the main body of the chamber from attack by chemicals stored therewithin.

As is well known, products of combustion from either furnaces, ovens or internal combustion engines contain many chemical compounds including nitrates, nitric oxide, carbon dioxide, carbon monoxide, sulphur dioxide, water, aldehydes, ketones, irritant gases and numerous petroleum compounds. In addition, there is present a high percentage of nitrogen which enters the combustion chamber in the air required to supply the combustion-supporting oxygen. Roughly, the ratio of combustion air to fuel by weight is 15 to 1. It is therefore apparent that nitrogen is a major component of combustion products. Other major components include carbon dioxide and monoxide.

Certain of the foregoing components condense readily at the temperatures and pressures prevailing in chamber 34. Others, particularly nitrogen, do not condense at the pressure preferably maintained in chamber 34, as for example, 125 to 200 p.s.i., and collect in chamber 34 from which they may be withdrawn at irregular intervals, as at a service station, upon opening the normally closed drain valve 38. The upper end of the storage chamber is provided with an automatic pressure relief and venting valve 39 through which non-condensing gas may be released at a predetermined pressure, as for example, 150 p.s.i. Nitrogen and the like inert gases at the selected predetermined pressure are conducted by conduit 40 into an expansion chamber arranged to make use of the energy present in this pressurized gas.

Desirably, the expansion chamber for utilizing energy present in the vented gas comprises an adiabatic expansion turbine 41 having its shaft 42 connected to drive some unit such as an air circulating fan or, as herein shown, to supplement the power required by compressor 25. However, there are various other components in a power house or in a motor vehicle requiring power in a quantity readily supplied by turbine 41. In expanding from the high pressure existing in conduit 40 to the substantially atmospheric pressure prevailing in turbine outlet 44, the gas becomes quite cold and therefore provides a very appreciable cooling capacity. If desired, this cold, low pressure gas may be passed in direct heat exchange with any component in the system in need of cooling. Alternatively, and as herein shown by way of example, the cold gas exhausted through conduit 44 passes through a heat exchanger 45 in counterflow heat exchange relation with atmospheric air supplied to the exchanger by air pump 46 and conduit 47. This atmospheric air enters the eye of air pump 46, passes through heat exchanger 45 where it is cooled, and then is conveyed by conduit 47 past control valves 48, 49, and 50, and into distributing conduits 51, 52 and 53. When valve 48 is open, cooled air is supplied through conduits 47 and 50 to a cooling chamber 55 in heat exchange relation with the hot compressed gases passing to chamber 34 through conduit 35. If valve 49 is open, cold air is conveyed through conduit 52 to a chamber 56 surrounding muffler 12 from which it is vented to the atmosphere through outlet 57. Likewise, if valve 50 is open, cooled air is supplied to passenger or cargo compartment 58 by way of conduit 53.

Desirably, control of valves 17 and 18 in conduits 15 and 16 is arranged to be operated simultaneously with clutch 29 for compressor 25. Although various arrangements may be employed for this purpose, a preferred control comprises a cable 60 having its midportion connected by a link 61 with a control lever 62 pivoted to a stationary support 63. Cable 60 passes over rollers 64 and has its remote end connected to a yoke 66 pivotally supported at 67 and having its bifurcated lower end journalled to a collar 68 rotatably seated in a groove of the driving jaw 69 of compressor clutch 29.

The upper end of yoke lever 66 is normally urged counterclockwise as viewed in the drawing by a strong spring 70 surrounding cable 60 with its right hand end bearing against an abutment 71. It will be understood that spring 70 is normally effective to maintain clutch 29 engaged to drive the compressor. The other end 72 of cable 60 passes over a roller 73 and has its upper end secured to an endless chain belt 74 supported by a pair of rollers 75. The right hand run of belt 74 is pivotally connected to operating arms 77, 78 of valves 17 and 18, respectively.

In the position of the parts shown in the drawing, clutch 29 is engaged, venting valve 17 is closed and outlet valve 18 is open to pass exhaust gases to compressor 25. However, if operating lever 62 is pivoted clockwise about its pivot 63 in opposition to spring 70, cable 60 is tensioned to pivot yoke 66 clockwise and thereby disengage clutch 29. At the same time cable 72 is tensioned to rotate chain belt 74 counterclockwise to reverse the position of valves 17 and 18 thereby venting the exhaust gases to the atmosphere through conduit 15. When control lever 62 is pivoted clockwise to the position shown in the drawing, spring 70 is effective to engage clutch 29 and to tension cable 80 thereby moving chain belt 74 clockwise to return valves 17 and 18 to the position shown in the drawing.

The operation of the described exhaust gas processing and separating apparatus will be quite apparent from the foregoing detailed description of its components. It will be understood that whenever the source of combustion products is in operation, such as the engine 10, the closed system constituting the present system or apparatus will be in operation to remove the combustion products continuously and as the same are formed at their source. Thus, in the disclosed arrangement, clutch 29 will be closed and compressor 25 will be effective to withdraw cooled exhaust gases through muffler 12, conduit 16, heat exchanger 20 and into the low pressure stage 26 of the compressor. Enroute to the compressor the gases will be cooled in precooling coil 20 typically located in the path of air passing over the vehicle and effective to cool gases in coil 20 to condense quantities of water vapor normally present in the products of combustion. Additional cooling of the exhaust gases is provided by heat exchange in exchanger 16' with cold gas flowing from expansion turbine 41 through conduit 44. Condensate formed in precooler 20 and in exchanger 16' collects in chamber 21 from which it can be removed from time to time by removing plug 22.

The compressed hot gas discharging from the high pressure cylinder 27 of compressor 25 passes through a second precooling coil 33 disposed to be cooled similarly to coil 20 and thence through conduit 35 into the high pressure storage chamber 34. Enroute the gases may be further cooled by cold air having inlet temperature appreciably below atmospheric. Accordingly, it is desirable that precooling coil 33 as well as conduit 35 leading to the storage chamber be arranged for gravity flow of condensate into collection and storage chamber 34. There certain constituents of the combustion products liquefy at pressures below that for which automatic relief valve 39 is set to operate, as 150 p.s.i.

The capacity of the storage tank can be held to a minimum and benefits can be derived from the high pressure inert and harmless gases which do not liquefy under the prevailing temperature and pressure conditions by conducting such non-liquefying components through conduit 40 to expansion turbine 41 wherein they expand to approximately atmospheric pressure while releasing energy to drive shaft 42 and while cooling to substantially the temperature of the ambient air. The cold gas so provided is conducted through heat insulated conduit 44 to any point in need of cooling. The cold expanded gas may be used to cool prime mover 10, compressor 25 or storage tank 34. However, as herein shown, the cold gas is passed through heat exchanger 45 to cool atmospheric air which is then circulated through conduit 47 and thereafter distributed as desired to cool various parts of the system, as for example, muffler 12, the hot compressed gas conduit 35, and the vehicle passenger or cargo compartment 58.

The manner in which manual control 62 is employed to declutch the compressor and to reverse the position of valves 17 and 18 has been described in considerable detail above and need not be repeated. However, it will be recognized that when control lever 62 is pivoted clockwise from the position illustrated, the combustion products will discharge directly to the atmosphere through exhaust pipe 15. Contaminated gas previously collected and held captive in storage tank 34 will continue to be held captive in the tank by check valve 36 and automatic relief valve 39. Obnoxious constituents of these captive gases in both liquid and gaseous form held captive in sump vessel 21 and pressure tank 34 may be removed in any suitable manner. Preferably, constituents within tank 34 are released under controlled pressure conditions preventing their escape to the atmosphere by equipment forming no part of this invention.

While the particular method and apparatus for processing products of combustion herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. That method of separating and collecting gaseous constituents from hot products of combustion discharging from a combustion chamber to separate and hold captive harmful ingredients while permitting harmless ingredients including carbon dioxide and nitrogen to escape to the atmosphere; said method comprising precooling said hot combustion products before compressing the same, compressing said gaseous products of combustion to a pressure not in excess of 200 p.s.i., passing the compressed gaseous products into high pressure storage means while cooling the same to approximately ambient atmospheric temperature, collecting condensate from said compressed gaseous products in the lower portion of said storage means, venting non-condensing constituents of said compressed products including carbon dioxide and nitrogen into an expansion chamber at a pressure not in excess of 200 p.s.i. to cool said vented gases, utilizing a portion only of the cooling capacity in said cooled expanded gas to pre-cool other quantities of combustion products enroute to said storage means before wasting said vented gases to the atmosphere, and utilizing other portions of the cooling capacity in said cooled expanded gas to pre-cool atmospheric air.

2. That method defined in claim 1 characterized in the step of utilizing energy derived from the expansion of the compressed gas vented from said storage means as part of the energy required to compress products of combustion enroute to said storage means.

3. That method defined in claim 1 characterized in the step of pre-cooling the products of combustion prior to compressing the same and in the further step of separating condensate from said pre-cooled combustion products before subjecting the same to compression.

4. That method defined in claim 1 characterized in that part only of said cooled gas vented from said storage means is utilized to pre-cool products of combustion enroute to said storage means, and utilizing other portions of said cooled gas to precool breathing air flowing to a space adapted to be occupied by humans.

5. That method of holding captive and utilizing beneficially energy contained in the hot gases exhausting from an internal combustion engine, which method comprises precooling said hot exhaust gases as the same issue from an internal combustion engine to condense and hold captive harmful ingredients present therein, collecting liquid condensate therefrom, compressing said precooled exhaust gases to a pressure not in excess of 200 p.s.i., subjecting the compressed gas to further cooling while collecting the resulting condensate and additional harmful ingredients, withdrawing non-condensing constituents of said compressed gases at a pressure not in excess of 200 p.s.i., expanding said withdrawn gases in an adiabatic expansion turbine to cool the withdrawn gas, and utilizing energy derived in part from said internal combustion engine and in part from said turbine to compress said precooled exhaust gases.

6. In combination with a road vehicle propelled by an internal combustion engine, that improvement for controlling the escape of objectionable constituents of the exhaust gas from said engine which comprises driving a compressor by power derived from said engine and utilizing said compressor to compress exhaust gas as it issues from said vehicle propelling engine, cooling said compressed gas and collecting condensate resulting from compressing and cooling said gas in order to collect and hold captive harmful ingredients in said engine exhaust gas, bleeding non-condensing compressed portions of said gas into an expansion chamber to cool such gas as expansion takes place, and utilizing such cooled gas to precool exhaust gas to approximately ambient temperature while said exhaust gas is enroute from said engine to said last mentioned condensate collector.

7. The combination defined in claim 6 characterized in the use of energy derived from the expansion of said compressed gas to supplement the energy supplied by said internal combustion engine.

8. In combination with a road vehicle propelled by an internal combustion engine, that improvement for controlling the escape of objectionable constituents of the exhaust gas from said engine, said improvement comprising driving a gas compressor from power derived from said engine, means for conducting exhaust gas from said engine through a precooler and into said compressor, a second precooler and at least one high pressure storage chamber, means conducting compressed gas from said compressor through said second precooler and into said storage chamber, means including said storage chamber for collecting condensate derived from said exhaust gas containing harmful ingredients thereof and holding the same captive, means for venting non-condensing portions of said compressed gas into a low pressure chamber to effect cooling thereof before allowing the vented gas to escape to the atmosphere, and beneficially utilizing the cooling effect so derived in said road vehicle.

9. The combination defined in claim 8 characterized in the provision of a plurality of valved passages for the cooled gas vented from said storage chamber each leading to a different portion of said vehicle and using the same for cooling purposes.

10. The combination defined in claim 9 characterized in the use of said cooled gas to air condition a compartment of said vehicle.

11. The combination defined in claim 9 characterized in the use of said cooled gas to cool gas flowing from said engine to said storage chamber.

12. The combination defined in claim 9 characterized in the provision of two-position power disconnect means interconnecting said engine and said gas compressor and effective in one position thereof to drive said compressor, valve means in said exhaust gas conducting means operable in one position thereof to vent said gas directly to the atmosphere, and control means for deactivating the drive to said compressor when the exhaust gases are being vented directly to the atmosphere.

13. In combination with an internal combustion engine type prime mover having an exhaust gas conduit provided with a pair of outlets, compressor means having an inlet connected to one of said outlets and arranged to be driven by said engine, storage means for compressed exhaust gas discharging from said compressor means, expansion turbine means having an inlet connected to said storage means through a relief valve effective to release non-condensing gas from said storage means at a pressure in excess of a predetermined pressure at which certain constituents of said exhaust gas condense, and means for passing cold low pressure gas discharging from said turbine into heat exchange with hot exhaust gas enroute to said storage means.

14. The combination defined in claim 13 characterized in the provision of means for controlling the flow of exhaust gas through said pair of outlets and selectively operable to vent said exhaust gas to the atmosphere and to said compressor means.

15. The combination defined in claim 13 characterized in the provision of means for controlling the flow of exhaust gas through said pair of outlets as well as for controlling the supply of power from said engine to said compressor means.

16. The combination defined in claim 13 characterized in the provision of means for passing cold gas discharging from said expansion turbine into heat exchange with exhaust gas flowing to said compressor means to remove water vapor therefrom, and means for collecting removed water vapor and holding the same separated from exhaust gas entering said compressor means.

17. That improvement in handling products of combustion to remove harmful constituents therefrom which comprises continuously removing products of combustion from a source thereof through cooled sound-muffling means, subjecting said products to cooling and pressure up to 150 p.s.i. to liquefy certain constituents thereof which constituents condense at pressures not in excess of 150 p.s.i., holding said liquid captive and venting the non-liquefying constituents to the atmosphere while maintaining a liquefying pressure on said liquefied constituents not in excess of 150 p.s.i.

18. In combination, a closed system for treating products of combustion from a source thereof to liquefy certain objectionable constituents thereof, said closed system including an inlet conduit opening to a source of products of combustion through sound-muffling means, means for subjecting said products to cooling and pressure up to 150 p.s.i. to liquefy objectionable constituents thereof, means for maintaining said liquefied constituents captive and in liquid form, and means for venting non-condensing portions of said products of combustion to the atmosphere at a pressure above that required to liquefy said objectionable constituents and not in excess of 150 p.s.i.

19. Apparatus for processing hot products of combustion exhausting from a combustion chamber to separate and hold captive harmful ingredients while permitting harmless ingredients including carbon dioxide and nitrogen to escape to the atmosphere, said apparatus comprising a closed system including heat exchange means for cooling the products of combustion discharging from a combustion chamber, compressor means for compressing said cooled gaseous products of combustion to a pressure not in excess of 200 p.s.i., heat exchange means for cooling the compressed gases discharging from said compressor means, storage means capable of storing gas at 200 p.s.i. and for receiving said cooled compressed gases and for storing condensate of harmful ingredients separating therefrom at pressures not in excess of 200 p.s.i., means for venting non-condensing compressed gas containing carbon dioxide, nitrogen and the like harmless ingredients from said storage means at a pressure not in excess of 200 p.s.i. and expanding the same to derive cooling therefrom, means for utilizing a portion of the cooling capacity of said cold expanded gas to cool hot products of combustion en route to said compressor means, and heat exchange means for utilizing another portion of said cold expanded gas to cool a moving stream of fluid and utilizing said cooled stream of fluid for cooling compressed products of combustion discharging from said compressor means and en route to said storage means.

References Cited in the file of this patent

UNITED STATES PATENTS

| | | |
|---|---|---|
| 1,849,149 | Monroe | Mar. 15, 1932 |
| 1,893,852 | Sullivan | Jan. 10, 1933 |
| 1,971,106 | Hasche | Aug. 21, 1934 |
| 2,143,283 | Schmidt | Jan. 10, 1939 |
| 2,160,187 | Winkler | May 30, 1939 |
| 2,641,114 | Holthaus | June 9, 1953 |
| 2,670,613 | Haltenberger | Mar. 2, 1954 |
| 2,713,781 | Williams | July 26, 1955 |
| 2,777,301 | Kuhn | June 15, 1957 |
| 2,907,182 | Kulinski | Oct. 6, 1959 |